United States Patent
Specht et al.

(10) Patent No.: US 12,015,609 B2
(45) Date of Patent: *Jun. 18, 2024

(54) SECURE IDENTITY PROVIDER AUTHENTICATION FOR NATIVE APPLICATION TO ACCESS WEB SERVICE

(71) Applicant: Inductive Automation, LLC, Folsom, CA (US)

(72) Inventors: Joel Specht, Folsom, CA (US); Matthew Rojas, Roseville, CA (US)

(73) Assignee: INDUCTIVE AUTOMATION, LLC, Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,622

(22) Filed: Jan. 12, 2024

(65) Prior Publication Data
US 2024/0154962 A1 May 9, 2024

Related U.S. Application Data

(63) Continuation of application No. 18/088,561, filed on Dec. 24, 2022, now Pat. No. 11,916,905, which is a (Continued)

(51) Int. Cl.
*H04L 9/40* (2022.01)
*H04L 67/02* (2022.01)

(52) U.S. Cl.
CPC ...... *H04L 63/0876* (2013.01); *H04L 63/1425* (2013.01); *H04L 63/20* (2013.01); *H04L 67/02* (2013.01)

(58) Field of Classification Search
CPC ..... H04L 63/0876; H04L 63/20; H04W 12/30
See application file for complete search history.

(56) References Cited

U.S. PATENT DOCUMENTS

| | | |
|---|---|---|
| 6,704,873 B1 | 3/2004 | Underwood |
| 8,200,971 B2 | 6/2012 | Edwards |

(Continued)

OTHER PUBLICATIONS

United States Office Action, U.S. Appl. No. 18/088,561, filed Aug. 15, 2023, 9 pages.

*Primary Examiner* — Esther B. Henderson
(74) *Attorney, Agent, or Firm* — Fenwick & West LLP

(57) ABSTRACT

A native application on a client computing device enables secure user authentication via an identity provider (IdP) for accessing services of a web service provider. The native application forwards a redirect request generated by a main gateway of the service provider and including an IdP uniform resource locator (URL) to a system browser of the client computing device. The redirect request directs the system browser to a broker gateway of the service provider that registers an authentication response handler and redirects the system browser to the IdP URL to enable a user of the native client computing device to authenticate. After the broker gateway receives an IdP authentication response from the IdP following authentication by the user, the broker gateway provides the IdP authentication response to the native application for providing back to the main gateway. The main gateway finally processes the authentication response to complete the authentication request.

20 Claims, 7 Drawing Sheets

Related U.S. Application Data continuation of application No. 17/524,595, filed on Nov. 11, 2021, now Pat. No. 11,570,172, which is a continuation of application No. 17/324,988, filed on May 19, 2021, now Pat. No. 11,201,866.

(60) Provisional application No. 63/131,766, filed on Dec. 29, 2020.

(56) References Cited

U.S. PATENT DOCUMENTS

| | | |
|---|---|---|
| 9,009,848 B2 | 4/2015 | Orsini et al. |
| 11,558,383 B1 | 1/2023 | Au Yeung et al. |
| 2006/0080352 A1* | 4/2006 | Boubez ................ H04L 63/166 |
| | | 707/999.102 |
| 2017/0339070 A1 | 11/2017 | Chang et al. |
| 2018/0109506 A1 | 4/2018 | Helsen et al. |

* cited by examiner

SECURE IDENTITY PROVIDER AUTHENTICATION FOR NATIVE APPLICATION TO ACCESS WEB SERVICE

CROSS-REFERENCE TO RELATED APPLICATIONS

This application is a continuation of U.S. application Ser. No. 18/088,561, filed Dec. 24, 2022, now U.S. Pat. No. 11,916,905, which is a continuation of U.S. application Ser. No. 17/524,595, filed Nov. 11, 2021, now U.S. Pat. No. 11,570,172, which is a continuation of U.S. application Ser. No. 17/324,988, filed May 19, 2021, now U.S. Pat. No. 11,201,866, which application claims the benefit of and priority to U.S. Provisional Application No. 63/131,766, filed Dec. 29, 2020, which is incorporated by reference herein in its entirety.

BACKGROUND

Field of Art

This disclosure relates generally to user authentication, and in particular to user authentication on native applications via identity providers.

Description of Art

Native applications, such as mobile applications, can be developed to include, or "wrap," an embedded web browser (i.e., a "web view") for interfacing with web service providers, such as a mobile application corresponding to a particular web application. Developing native applications that use web views enables application developers to save time and resources by reusing existing functionality of a web service provider while also gaining access to native functionality. For example, a native application on a mobile device can include a web view that accesses existing features of a web application and also accesses native features of the mobile device, e.g., scanning bar codes using a camera of the mobile device.

Furthermore, many web service providers provide greater flexibility for users by enabling user authentication via multiple possible third-party identity providers (IdPs), such as Facebook, Google, Salesforce, etc. By interfacing with such web service providers via a web view of a native application, application developers can enable users of the native application to authenticate through the same IdPs without development of custom native software to facilitate authentication with each IdP.

However, IdP authentication with a web service via a web view of a native application presents various security issues. For instance, native applications that authenticate users with web services via web views can access authentication data passed between a user and an IdP that would normally not be accessible to a web service provider, e.g., when authenticating with the web service provider via a standalone web browser. Furthermore, to address these security issues, some IdPs prevent any authentication via web views. Existing systems do not provide a solution to overcome these limitations of web service provider authentication via native application web views in an IdP protocol-agnostic manner.

SUMMARY

A native application on a client computing device enables secure user authentication via an identity provider (IdP) for accessing services of a web service provider through one or more gateways. The native application may include an embedded web browser (i.e., a "web view) that interfaces with the gateways of a web service provider corresponding to the native application. For example, the native application may be a native version of a web application for a particular client computing environment, such as a mobile application native to a type of mobile device. In order to facilitate secure user authentication through a main gateway of the web service provider via one or more IdPs, the native application intercepts a redirect request received from the main gateway including an IdP uniform resource locator (URL) and forwards the redirect request to a system web browser of the computing device (e.g., Safari™, Google Chrome™, Microsoft Edge™, etc.). The system web browser facilitates authentication of a user of the computing device through the IdP using the IdP URL. After the service provider receives an IdP authentication response from the IdP at an authentication response handler, the service provider provides the IdP authentication response to the native application for providing the response back to the main gateway. The main gateway confirms the user was successfully authenticated using the IdP authentication response, and provides the native application access to available services.

In some embodiments, network communications with the web service provider are distributed among multiple gateways by a load balancer. In these embodiments, a gateway that the system web browser establishes a communication session with (referred to herein as a "broker gateway") may be different than the gateway that the native application establishes a communication session with (referred to herein as a "main gateway"). If the broker gateway is not the main gateway it cannot process the IdP authentication response received from the IdP to complete the pending authentication request because the pending authentication request originated at the main gateway. To address this, the native application obtains the IdP authentication response from the broker gateway and forwards the IdP authentication response back to the main gateway. In particular, the native application embeds a local server (referred to herein as an "authentication server") to communicate with the broker gateway through the system web browser, such by using HTTP redirect requests.

In some embodiments, the IdP authentication request or authentication response may be provided by an IdP via an HTTP POST request, such as when the authentication response or authentication request includes a large amount of data. For example, if the IdP uses security assertion markup language (SAML) authentication protocols, the IdP may provide a SAML authentication response including an extensible markup language (XML) document via a POST request. In this case, because communication with the authentication server may not be secure (e.g., the authentication server does not use a secure socket layer (SSL)), the system web browser may prompt a user to allow the web server to redirect the POST request to the authentication server. In order to prevent such a prompt from the system web browser disrupting or otherwise negatively impacting the user experience, the broker gateway partitions the authentication response into a set of smaller data chunks and provides each data chunk via a separate HTML GET request.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Gateway System Environment

Figure 1:
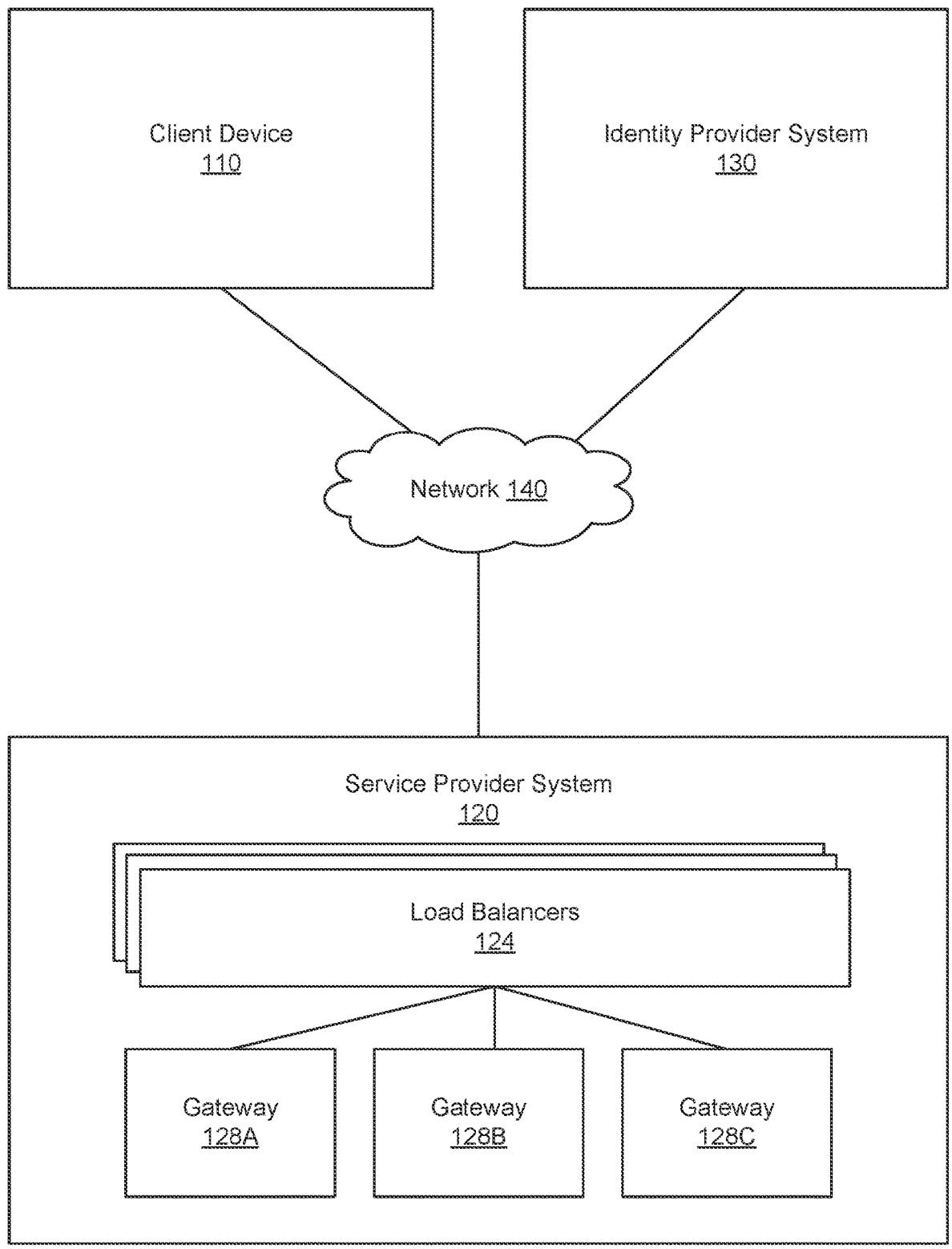
FIG. 1 is a high-level block diagram of a system environment for a client device including a native application associated with a service provider system, in accordance with some embodiments.

FIG. 1 is a high-level block diagram of a system environment for a client device 110 including a native application associated with a service provider system 120, in accordance with an embodiment. The system environment shown in FIG. 1 includes the client device 110, the service provider system 120, an identity provider (IdP) system 130, and a network 140. For clarity, only one client device 110, one service provider system 120, and one IdP system 130 are shown in FIG. 1. Alternate embodiments of the system environment can have any number of client devices 110, service provider systems 120, or IdP systems 130. Additionally, the relative configurations of the client device 110, the service provider system 120, and the IdP system 130 may vary in different embodiments. The function performed by the various entities of FIG. 1 may also vary in different embodiments. As one example of an alternate embodiment, the client device 110 and the service provider system 120 may be modules of the same machine.

The client device 110 is a computing device including a native application that communicates with the service provider 120 via the network 140. For instance, the client device 110 can be a desktop computer, a laptop computer, a mobile device (e.g., a mobile phone, a tablet, etc.), or any other suitable device. In some embodiments, the native application wraps an embedded web browser (i.e., a "web view") for interfacing with services of the service provider 120, such as interfacing with one or more web applications of the service provider 120. The client device 110 also includes one or more system web browsers, such as Safari™, Google Chrome™, Microsoft Edge™, etc. As will be described in greater detail below with reference to FIGS. 2-4, the native application enables users of the client device 110 to securely authenticate with the service provider 120 via one or more IdPs (e.g., the IdP system 130) using one of the one or more system browsers of the client device 110.

The service provider system 120 provides web services to client computing devices (e.g., the computing device 110) via the network 140. The service provider system 120 may provide various web services, such as one or more web applications or cloud computing services. In some embodiments, the service provider system 120 provides web services for monitoring and interacting with local or remote industrial systems and processes. In the embodiment shown in FIG. 1, the service provider system 120 includes load balancers 124 that distribute network traffic across a set of gateways 128 (e.g., gateways 128A, 128B, and 128C) that provide web services to client computing devices. Although three gateways 128 are depicted in FIG. 1, the service provider system 120 may include any number of gateways 128. The service provider system 128 may further include any number of load balancers 124. In the same or different embodiments, the load balancers 124 may not be a component of the service provider 120, e.g., a load balancer provided by a third-party system. Conventional modules such as web servers, network interfaces, security functions, failover servers, management and network operations consoles, and the like are not shown for the service provider system 120 so as to not obscure the details of the system architecture; however, embodiments may include such conventional modules. Additionally, the service provider system 120 and its components (e.g., the gateways 128) may include more, fewer, or different modules or data stores than those shown in FIG. 1, and the functions can be distributed among the modules and data stores in a different manner than is shown in FIG. 1.

The gateways 128 provide one or more interfaces for client computing devices to access services of the web service provider 120. In some embodiments, the gateways 128 are individual web servers or server clusters corresponding to a particular web application. The load balancers 124 directs network communications from the client computing devices to different gateways 128, e.g., to manage network load. After a communication endpoint of a client computing device, such as the native application or a system browser of the client device 110, is directed to a particular gateway 128, the gateway 128 may establish a communication session with the communication endpoint (e.g., a hyper-text transfer protocol (HTTP) session). As used herein, a first gateway 128 that communicates directly with the native application of the client device 110 is referred to as a "main gateway," and a second gateway 128 that communicates directly with the system browser of the client device 110 is referred to as a "broker gateway." Although the main gateway and the broker gateway are distinguished herein, in some cases the main gateway and the broker gateway may be the same gateway, such as if the gateways 128 are not managed by a load balancer 124 or if the native application and the system browser are directed to the same gateway 128 by a load balancer 124. In these embodiments, a gateway that the load balancer directs the system web browser to (referred to herein as a "broker gateway") may be different than the gateway that the load balancer directs the native application to (referred to herein as a "main gateway"). The gateways 128 further enable users of the client computing devices to authenticate with the service provider 120 through one or more third-party IdPs (e.g., the IdP 130). As will be described in greater detail below with reference to FIGS. 2-4, the gateways 128 perform various processing of IdP authentication requests and responses to enable secure authentication of native applications through IdPs.

In the same or different embodiments, the IdP system 130 is a third-party provider of authentication services. Although the IdP system 130 is depicted separately from the service provider system 120, in some embodiments the IdP system 130 is a component of the service provider system 120. In other embodiments, the IdP system 130 is a third-party provider of authentication services. For example, the IdP system 130 can be a software application or service with an established user-base, such as Facebook™, Google™, or Salesforce™ In embodiments described herein, the IdP system 130 authenticates authentication requests for users of client computing devices of the service provider system 120. After authenticating the authentication requests, the IdP system 130 provides authentication responses that describe results of the authentication, e.g., whether or not a user was successfully authenticated. For example, the IdP 130 may provide authentication responses directly to a gateway 128 of the service provider system 120 via an authentication callback handler. The IdP system 130 may use one or more authentication communication protocols, such as an OpenID Connect (OIDC) protocol or a security assertion markup language (SAML) protocol. If the IdP system 130 uses SAML 2.0 for authentication, communication between the IdP system 130 and the server provider system 120 may be facilitated by one or more SAML 2.0 HTTP bindings, such as an HTTP Redirect binding, or an HTTP POST binding.

The network 140 may comprise any combination of local area or wide area networks, using wired and/or wireless communication systems. In one embodiment, the network 140 uses standard communications technologies and/or protocols. For example, the network 140 includes communication links using technologies such as Ethernet, 802.11 (WiFi), worldwide interoperability for microwave access (WiMAX), cellular networks (e.g., 3G, 4G, 5G), code division multiple access (CDMA), digital subscriber line (DSL), Bluetooth, Near Field Communication (NFC), Universal Serial Bus (USB), or any combination of communication protocols (e.g., TCP/IP, HTTP, S1v1TP, FTP), encodings or formats (e.g., HTML, JSON, XML), or protection schemes (e.g., VPN, secure HTTP, SSL). In some embodiments, all or some of the communication links of the network 140 may be encrypted using any suitable technique or techniques.

Figure 2A:
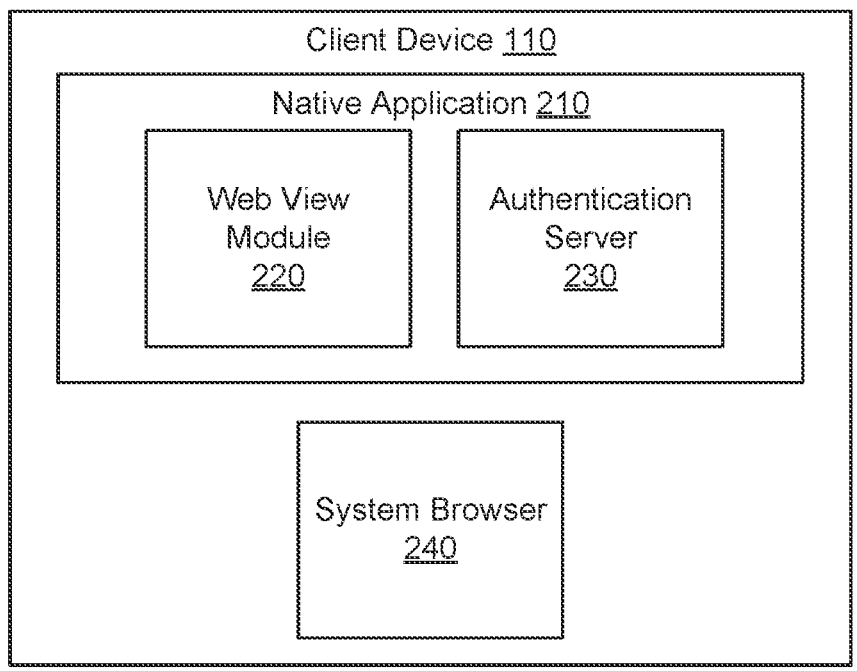
FIG. 2A is a high-level block diagram of a client device architecture, in accordance with some embodiments.

FIG. 2A is a high-level block diagram of the client device 110 architecture, in accordance with some embodiments. In the embodiment shown in FIG. 2A, the client device 110 includes a native application 210 and a system browser 240. Additionally, the client device 110 may include more, fewer, or different components than those shown in FIG. 2A, and the functions can be distributed among the modules in a different manner than is shown in FIG. 2A.

The native application 210 is a software application configured for execution by a native operating system of the client device 110. For instance, the native application 210 may be an iOS application, an Android application, a Microsoft Windows application, a macOS application, or any other suitable application configured for a particular operating system environment. In the embodiment shown in FIG. 2A, the native application 210 includes a web view module 220 and an authentication server 230. The native application 210 provides a native interface for accessing services provided by the service provider system 120, such as one or more web applications of the service provider 120. In the embodiment shown in FIG. 2A, the native application 210 includes a web view module 220 and an authentication server 230. As will be described in greater detail below, the native application 210 facilitates one or more authentication processes for authentication of a user of the client device 110 with the service provider system 120. In particular, the native application 210 facilitates authentication of the user by the IdP system 130 using the web view module 220 and the authentication server 230. The native application may further be configured for single sign-on (SSO), such that the user does not always re-authenticate with the service provider system 120 to access relevant services through the native application 210. Various embodiments of secure IdP authentication using an authentication server of the native application 210 and the system browser 240 through are further described in greater detail below with reference to FIGS. 3-4.

The web view module 220 manages a web view wrapped by the native application 210. For example, the web view module 220 may be an "Android WebView" or an "iOS WKWebView." Using the wrapped web view, the web view module 220 provides an interface for using services of the service provider system 120. Further, in order to the access services of the service provider system 120, the web view module 220 requests authentication of the user of the client device 110 through a main gateway of the service provider system 120. For example, the web view module 220 may access or display an interface of the service provider system 120 for a user to select from one or more authentication processes.

If the web view module 220 requests authentication by the IdP system 130, the web view module 220 receives a redirect request from the main gateway (e.g., an HTTP 302 redirect). The redirect request is configured to direct a web browser to a redirect uniform resource locator (URL) directed to a broker gateway of the service provider system 120, and additionally includes an IdP URL identifying an interface of the IdP system 130. For example, the IdP URL may be a query parameter of the redirect URL. Additionally, the redirect request may include an identifier of the IdP system 130, a state key identifying the particular authentication session between the native application 210 and the main gateway, or some combination thereof. Although the term URL is used herein, one skilled in the art will appreciate that various different uniform resource identifiers (URIs) may be used where appropriate. Before forwarding the redirect request to the system browser 240, the web view module 220 modifies the redirect request. In particular, the web view module 220 modifies the redirect request to include a port of the authentication server 230. For instance, the authentication server 230 may add the authentication server 230 port a query parameter of the redirect URL. The web view module 220 may further modify the IdP URL in the redirect request to be directed to the authentication server 230 in order for the system browser 240 to retrieve an IdP authentication request from the authentication server 230, as described in further detail below with reference to the authentication server 230. For instance, by replacing the scheme, hostname, and port of the IdP URL with that of the authentication server 230. After modifying the redirect request, the web view module 220 forwards the modified redirect request to the system browser 240, which facilitates secure authentication of the user by the IdP system 130. In particular, the system browser 240 may facilitate authentication of the user by the IdP system 130 using the broker gateway directed to by the redirect URL, as described in greater detail below with reference to FIGS. 2B, 3, and 4. Once the user has authenticated with the IdP system 130 through the system browser 240, the web view module 220 receives an IdP authentication response generated by the IdP system 130. The web view module 220 forwards the IdP authentication response to the main gateway to complete the authentication process and, if the user was successfully authenticated, access services of the service provider system 120.

The authentication server 230 is an embedded server of the native application 210. For instance, the authentication server 230 may be an embedded HTTP server. The authentication server 230 provides a channel for the system browser 240 to communicate with the native application 210. In some embodiments, the secure authentication process of the native application 210 is configured to be agnostic relative to a particular computing environment of the native application 210. In this case, the authentication server 230 may open a communication channel on a local network of the client device 110 through which the system browser 240 can communicate with the authentication server 230, e.g., using a localhost IP address. The authentication server 230 may further open the communication channel on the local network for each authentication attempt using an ephemeral port. Among other advantages, using a local network to communicate with the system browser 240 enables the secure authentication process of the native application 210 to be agnostic of any a particular computing environment of the native application 210. For instance, the user of the client device does not need to install trusted certificates for the client device 110 that enable authentication server 230 to establish a trusted communication channel with the system browser 240 (e.g., using transport layer security (TLS) or secure sockets layer (SSL) protocols).

As will be described in greater detail below with reference to FIGS. 2B and 3, in some embodiments the authentication server 230 receives the IdP authentication response as a set of data chunks. In this case, the authentication server 230 assembles a copy of the IdP authentication response from the set of data chunks.

Although the authentication server 230 is depicted in FIG. 2A as a component of the client device 120, in some embodiments the authentication server 230 is initialized for a particular authentication attempt (e.g., by the web view module 220 or another component of the native application 210) and is shut down after the particular authentication attempt is completed. For example, the native application 210 may initialize the authentication server 230 after the redirect request is received from the main gateway of the service provider system 120. Similarly, the native application 210 may shut down the authentication server 230 after the authentication response is provided to the main gateway.

In some embodiments, the native application 210 obtains an IdP authentication request from the main gateway of the service provider separately from the redirect request. In particular, if the relevant IdP uses an authentication protocol wherein an authentication request is configured to use an HTTP POST request (e.g., the SAML POST binding), the main gateway may generate and provide the IdP authentication request to the web view module 220 separately from the redirect request. In this case, in order to make the IdP authentication request available to the broker gateway, the main gateway stores the IdP authentication request in association with an authentication session for the native application 210 and provides the native application with an identifier pointing to the authentication request stored on the main gateway. The native application can then use the identifier to obtain the IdP authentication request from the main gateway at an appropriate time in the authentication process to provide the authentication request to the broker gateway through the authentication server 230. For instance, the authentication server 230 may obtain the IdP authentication request from the main gateway through the native application 210 after receiving a request from the broker gateway to authenticate using the relevant identity provider, as described in more detail below with reference to FIG. 3. Alternatively, the native application 210 may obtain the IdP authentication request from the main gateway before forwarding the redirect request to the broker gateway through the system browser 240 and cache the IdP authentication request in the authentication server to later be accessed by the system browser 240, as described in more detail below with reference to FIG. 4. In other embodiments, the native application 210 obtains the IdP authentication request using other techniques. For instance, if the IdP system 130 uses the SAML authentication protocol, the native application 210 may obtain the IdP authentication request using a different SAML binding than HTTP POST (e.g., HTTP Redirect, HTTP artifact, or Simple Object Access Protocol (SOAP). An example embodiment that uses such other techniques is described below with reference to FIG. 5.

Furthermore, in these embodiments the modification by the web view module 220 of the redirect request includes modifying the IdP URL to be directed to the authentication server 230 in order for the redirect request to be retrieved from the authentication server 230 by the system browser 240, such as by replacing the scheme, hostname, and port of the IdP URL with that of the authentication server 230. Various embodiments for facilitating IdP authentication using an IdP authentication request obtained from the main gateway of the service provider system 120 are described in greater detail below with reference to FIGS. 3-4. In the same or different embodiments, the native application 210 receives the IdP authentication request with the redirect request, such as if the relevant IdP uses an authentication protocol wherein the IdP authentication request is intended to be communicated without an HTTP POST request (e.g., if the SAML HTTP redirect binding is used instead), as described in greater detail below with reference to FIG. 5. In this case, the web view module 220 may redirect the system browser 240 to the broker gateway using the redirect request without modifying the redirect request or communicating any further with the main gateway before providing the IdP authentication response to the main gateway.

The system browser 240 is a standalone web browser application. The system browser 240 facilitates communication between the native application 210, a broker gateway of the service provider system 120, and the IdP system 130 for authenticating a user of the client device 110 with the IdP system 130. Among other advantages, using the system browser 240 for user authentication ensures compliance with security requirements of certain IdPs that prevent authentication via web views wrapped by a native application.

Figure 2B:
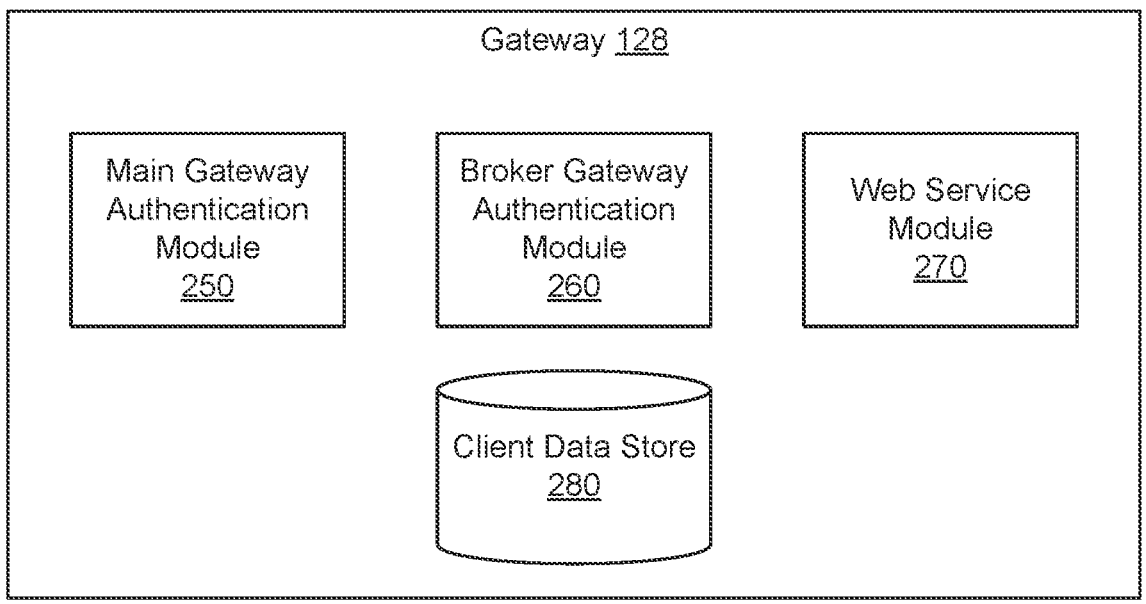
FIG. 2B is a high-level block diagram of a gateway system architecture, in accordance with some embodiments.

FIG. 2B is a high-level block diagram of a gateway 128 system architecture, in accordance with some embodiments. In the embodiment shown in FIG. 1, the gateway 128 includes a main gateway authentication module 250, a broker gateway authentication module 260, a web service module 270, and a client profile store 280. Additionally, the gateway 128 may include more, fewer, or different modules and data stores than those shown in FIG. 2B, and the functions can be distributed among the modules and data stores in a different manner than is shown in FIG. 2B.

The main gateway authentication module 250 communicates directly with the native application 210 to facilitate user authentication for accessing services of the service provider system 120. In particular, the main gateway authentication module 250 receives requests from the native application 210 to authenticate a user of the client device 110. As described above with reference to FIG. 2A, if the request indicates that the main gateway authentication module 250 should authenticate the user through the IdP system 130, the main gateway authentication module 250 generates a redirect request for providing to the native application 210. In non-native scenarios, such as when the request for user authentication originates from a browser application, the main gateway authentication module 250 generates the redirect request with a redirect URL directed to the IdP URL. However, if the main gateway authentication module 250 determines that the request for user authentication originated from the native application 210, the main gateway authentication module 250 generates the redirect with a redirect URL directed to a broker gateway of the service provider system 120. Directing the redirect request to the broker gateway enables the broker gateway to register an authentication response handler for receiving the IdP authentication response before the user authenticates with the IdP system 130 through the system browser 240, as described in greater detail below with reference to the broker gateway authentication module 260.

The main gateway authentication module 250 further provides the redirect request to the native application 210 to use for authenticating the user through the IdP system 130 via the secure browser 240. After the user has authenticated through the system browser 240, the main gateway authentication module 250 receives an IdP authentication response generated by the IdP system 130. The main gateway authentication module 250 processes the received IdP authentication response to determine whether the user was successfully authenticated. If successfully authenticated, the main gateway authentication module 250 communicates with one or more other components of the gateway 128 to provide the native application 210 access to services of the service provider system 120, e.g., via the web service module 270.

As described above with reference to FIG. 2A, the main gateway authentication module 250 may receive a request for an IdP authentication request through a secure communication session established with a component of the native application 210 (e.g., the web view module 220 or the authentication server 230). In this case, the main gateway authentication module 250 generates an IdP authentication request for the IdP system 130. For example, if the IdP system 130 uses SAML, the main gateway authentication module 250 may generate a SAML authentication request for the IdP system 130. After generating the IdP authentication request, the main gateway authentication module 250 provides the generated IdP authentication request to the native application 210 via the secure communication session.

The broker gateway authentication module 260 communicates directly with the system browser 240 to facilitate user authentication for accessing services of the service provider system 120. As described above with reference to the web view module 220, the broker gateway authentication module 260 receives a redirect request from the system browser 240 that has been modified by the native application 210. The broker gateway authentication module 260 processes the modified redirect request to register an authentication response handler for receiving the IdP authentication response from the IdP system 130 and forwarding the IdP authentication response to the authentication server 230 based on the authentication server 230 port. After registering the authentication response handler, the broker gateway authentication module 260 redirects the system browser 240 to the modified IdP URL included in the modified redirect request and directed to the authentication server 230. After the authentication server 230 and the system browser 240 facilitate user authentication through the IdP system 130, the broker gateway authentication module 260 receives the IdP authentication response from the IdP system 130 via the registered authentication response handler. The registered authentication response handler of the broker gateway authentication module 260 forwards the authentication response to the authentication server 230 via a redirect through the system browser 240.

In some embodiments where the IdP authentication response is intended to be communicated via a POST request, the broker gateway authentication module 260 partitions the IdP authentication response into a set of data chunks for providing individually to the authentication server 230. In particular, the broker gateway authentication module 260 may embed each data chunk into a URL of a GET request for providing to the authentication server 230. In this case, the size of each data chunk may be less than a threshold size selected according to a URL size limit of one or more web browsers (e.g., the system browser 240). In particular, the threshold size limit may be selected to ensure that the size of the GET request URLs including the data chunks do not exceed the URL size limits of the one or more web browsers. As an example, the threshold size limit may be 2048 eight-byte characters. The broker gateway authentication module 260 may further provide a total number of data chunks in the set of data chunks to the authentication server 230 so that the authentication server 230 knows when it has received all of the data chunks representing an IdP authentication response. For example, the total number of data chunks may be included as a query parameter of the GET request URL for the first data chunk transmitted. Additionally, or alternatively, the GET request URLs for the data chunks may include information identifying the authentication session between the native application 210 and the main gateway, such as a state key included in the redirect request received from the main gateway.

In an exemplary embodiment, the broker gateway authentication module 260 first encodes the IdP authentication response as UTF-8 bytes and then base64-url encodes the bytes representing the IdP authentication response into a URL-safe string. The broker gateway authentication module 260 determines a base length of a GET request URL without an embedded data chunk, and subtracts the base length from the URL size threshold to determine a size of a data chunk for the GET request. The broker gateway authentication module 260 extracts a portion of the base64-url string representing the IdP authentication response with the data chunk size and adds the portion to the GET request URL. The broker gateway authentication module 260 may further add a state key for the authentication session as a key for the GET request URL.

In some embodiments, some or all of the redirects through the system browser 240 by the broker gateway authentication module 260 and the authentication server 230 are performed using custom redirect instructions (e.g., computer code) rather than a standard browser redirect (e.g., an HTTP 302 redirect). In particular, some web browsers assume an infinite redirect has been entered if a threshold number of standard browser redirects occur in a certain time frame and responsively display an error message. In order to avoid an error message being displayed, the broker gateway authentication module 260 may provide each data chunk to the authentication server 230 with a non-redirect status code, such as a 200 OK HTTP status code, and custom instructions that instructs the system browser 240 to redirect to the authentication server 230. For example, the custom instructions may be included in an HTML document containing JavaScript code. Similarly, requests by the authentication server 230 for additional data chunks from the broker gateway authentication module 260 may be provided with a non-redirect status code and an HTML document that instructs the system browser 240 to redirect to the broker gateway.

In some embodiments, the custom redirect instructions may result in the system browser 240 alternating between displaying an interface associated with the authentication server 230 and an interface associated with the broker gateway authentication module 260. In contrast, the standard browser redirect may be processed in the background by the system browser 240 without altering what is displayed by the client device 110. To reduce alteration in the visual display during the transmitting of the set of data chunks, the broker gateway authentication module 260 and the authentication server 230 may alternate between using standard browser redirects and custom instruction redirects. For instance, a custom instruction redirect may be used every N number of redirects, with standard browser redirects used otherwise.

In some embodiments, the broker gateway authentication module 260 validates the IdP URL included in the redirect request by generating a temporary IdP URL to compare to the received IdP URL. For instance, the gateway 128 may generate IdP URLs using internal identifiers of IdPs, e.g., an identifier of the IdP system 130 included in the redirect request. In this case, the broker gateway authentication module 260 generates the temporary IdP URL using the IdP identifier included in the redirect request. The broker gateway authentication module 260 compares the temporary and received IdP URLs to confirm whether the URLs have matching hosts.

For a given authentication attempt by a client device a particular gateway 128 may act as only one of either the main gateway (e.g., via the main gateway authentication module 250) or the broker gateway (e.g., via the broker gateway authentication module 260) for the authentication attempt. Alternatively, the gateway 128 may act as both the main gateway and the broker gateway for a particular authentication attempt by a client device.

The web service module 270 provides services of the service provider 120 to client devices that have been successfully authenticated. For instance, the web service module 270 may provide access to one or more web applications of the to the native application 210. The web service module 270 may communicate with other components of the gateway 128 to determine whether a client device has been authentication, such as the main gateway authentication module 250.

The client data store 280 stores data for clients of the service provider system 120, such as the client device 110. Client data may include various information including identifiers (e.g., IP address, MAC address, Bluetooth address, etc.), historical logs, accessibility settings, generated reports, current or historical geolocation(s) according to established communication sessions, etc. Additionally, or alternatively, the client data store 280 may store information corresponding to an authentication session for a client, such as any information included in an IdP authentication response, e.g., a unique user ID in the IdP system 130, a username in the IdP system 130, a first name in the IdP system 130, a last name in the IdP system 130, an email address in the IdP system 130, a set of roles in the IdP system 130, a set of attributes of the user, and any other suitable information corresponding to the user. In some embodiments, some services of the service provider system 120 are only designated for access by permitted clients.

Processes for SAML Identity Provider Authentication

Figure 3:
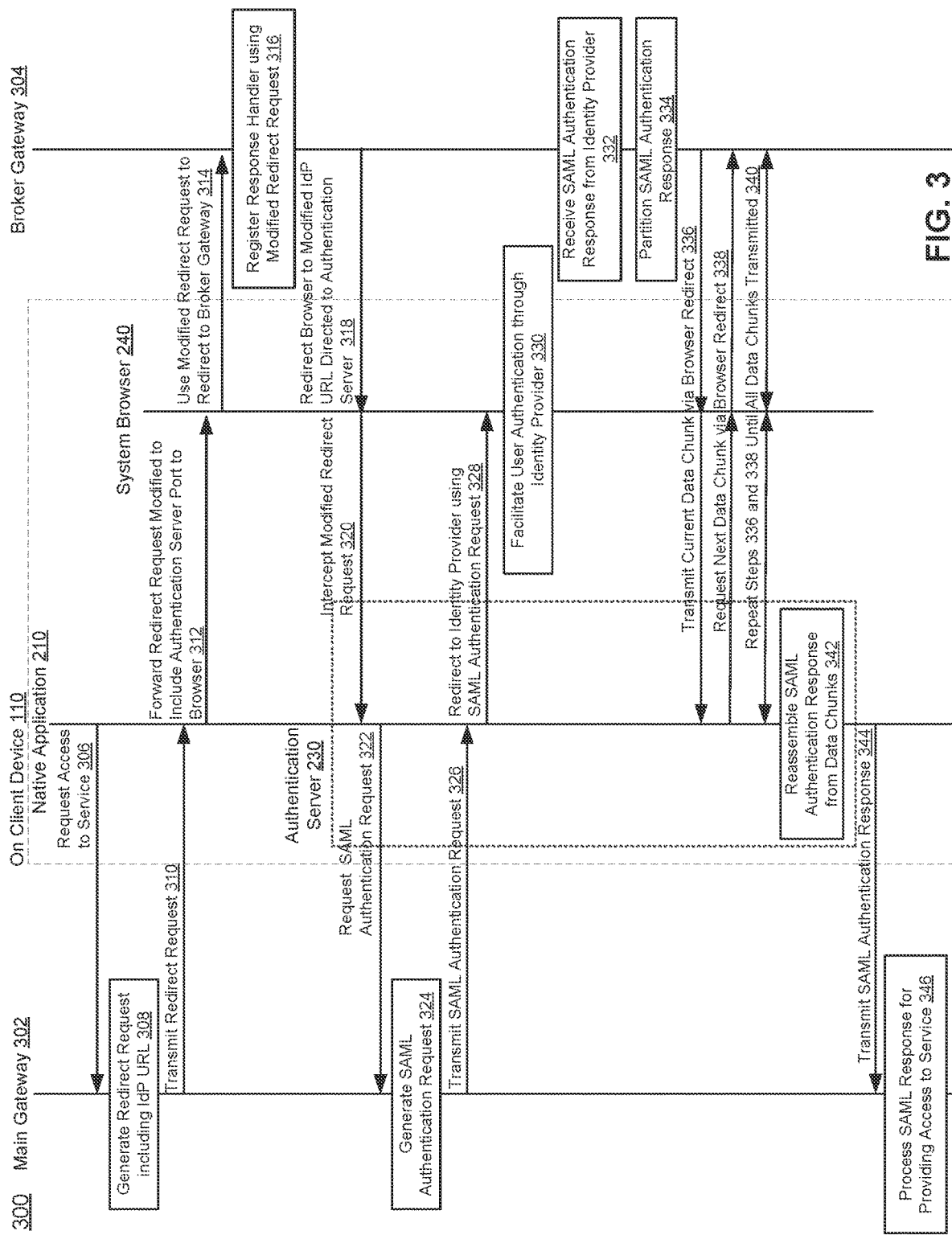
FIG. 3 illustrates a first sequence of interactions for authenticating a user of a native application using an identity provider system, in accordance with some embodiments.
Figure 4:
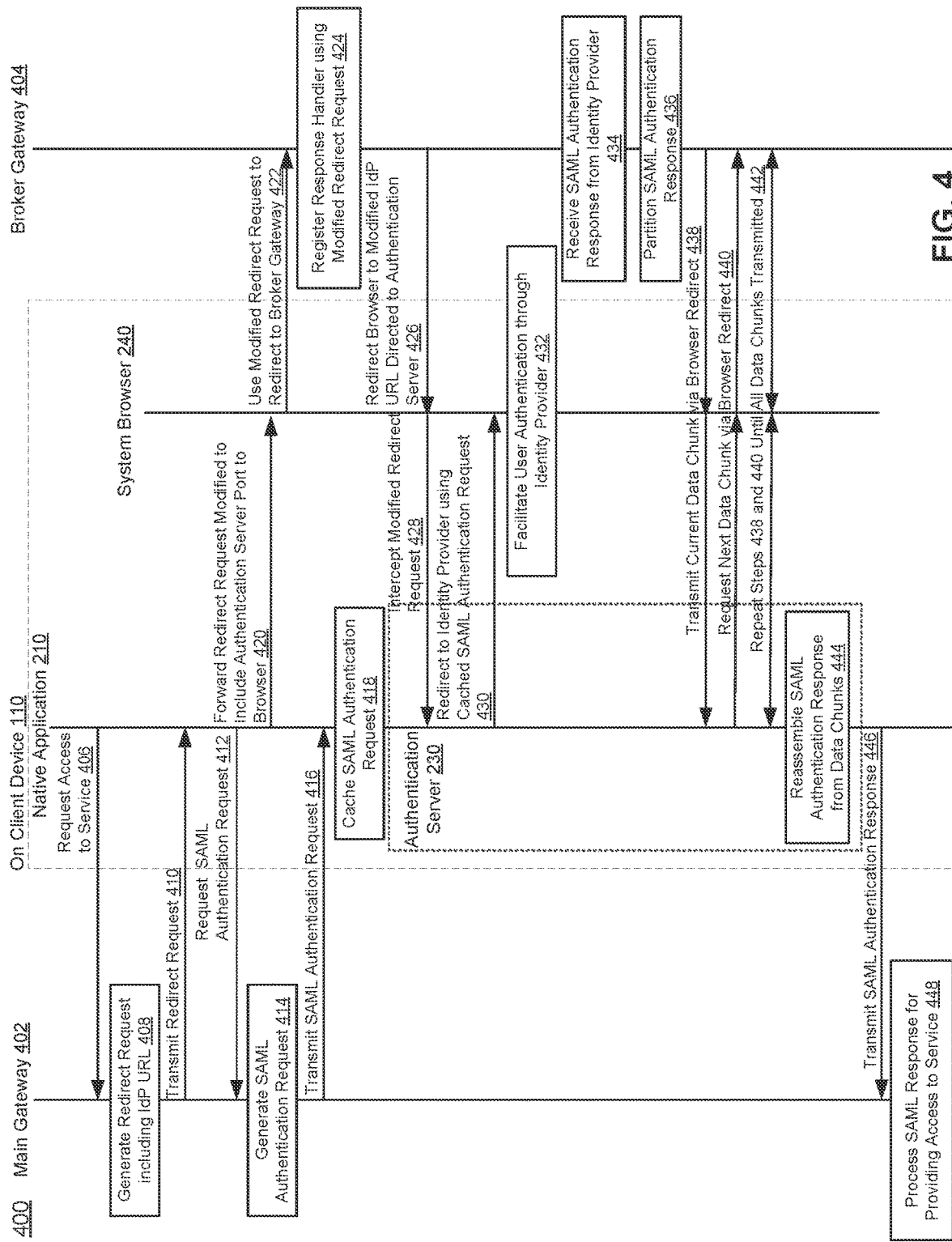
FIG. 4 illustrates a second sequence of interactions for authenticating a user of a native application using an identity provider system, in accordance with some embodiments.
Figure 5:
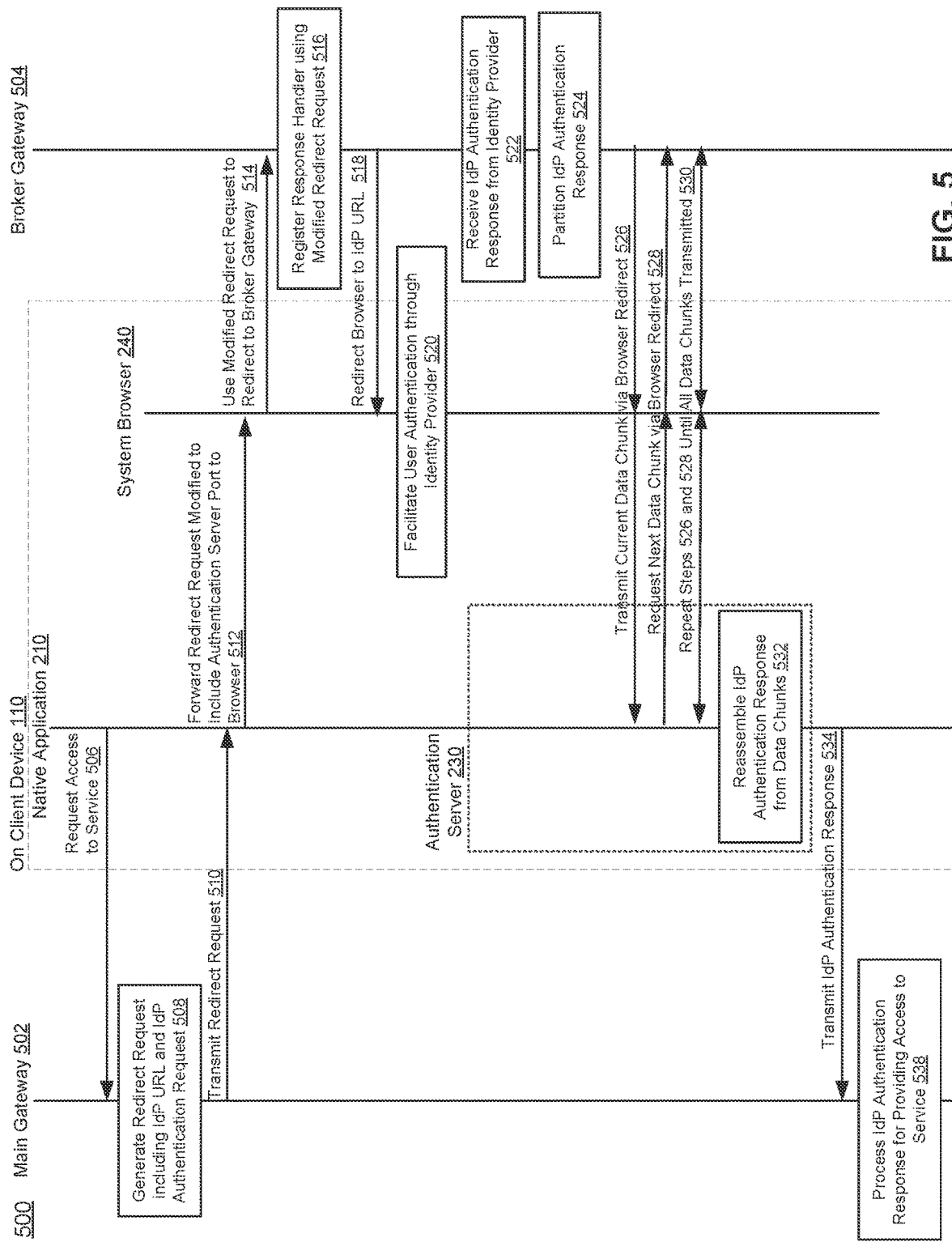
FIG. 5 is a flowchart illustrating a process for securely authenticating a user of a native application through an identity provider for accessing a web service, in accordance with some embodiments.

FIGS. 3-5 are a sequence diagrams illustrating embodiments of interactions between elements of the system environment 100 for authenticating a user of the native application 210 through the IdP system 130 using SAML for authentication. In other embodiments than those shown in FIGS. 3-5, some or all of the steps may be performed by other entities or components. In addition, some embodiments may perform the steps in parallel, perform the steps in different orders, or perform different steps. In relation to FIGS. 3 and 4, some embodiments may use other authentication protocols with similar characteristics as SAML, e.g., authentication protocols that can be configured to communicate authentication requests or authentication responses via HTTP POST requests.

FIG. 3 illustrates an embodiment of a first sequence of interactions 300 for authenticating a user of the native application 210 using the IdP system 130. In the embodiment shown, the sequence of interactions 300 begins with the native application 210 requesting 306 access to a service of the service provider system 120 through a main gateway 302. For example, the user of the native application 210 may select an option to login to the service provider system 120 using the IdP system 130. The user may interact with the service provider system 120 via a web view of the native application 210, as described above with reference to FIG. 2A.

Based on the request to access a service, the main gateway 302 generates 308 a redirect request including an IdP URL. For instance, the redirect request may include the IdP URL as a query parameter of a redirect URL. The redirect request has a redirect URL that directs back to one or more gateways of the service provider system 120 (e.g., to the broker gateway authentication module 260 of a particular gateway 128). As described above with reference to FIG. 2B, the redirect request may further include an identifier of the IdP system 130 or a state key identifying an authentication session of the native application 210 and the main gateway 302.

After generating 308 the redirect request, the main gateway 302 transmits 310 the redirect request to the native application 210. The native application 210 modifies the transmitted redirect request and forwards 312 the modified redirect request to the system browser 240. In particular, the native application 210 modifies the IdP URL to be directed to the authentication sever 230 and to add a port of the authentication server 230 to the redirect request. The native application 210 may determine that the IdP URL should be modified to be directed to the authentication server 230 responsive to identifying an indicator in the redirect request that an HTTP POST request will be used by the IdP system 130.

The system browser 240 uses 314 the modified redirect request to redirect to a broker gateway 304. For instance, the load balancer 124 may establish a communication session between the system browser 240 and the broker gateway 304 based on the redirect request. After the redirect to the broker gateway, the broker gateway 304 registers 316 an authentication response handler using the modified redirect request.

In particular, the authentication response handler has access to the port of the authentication server 230 included in the modified redirect request. The authentication response handler may additionally have access to other information included in the redirect request, such as a state key for the authentication session or an identifier of the IdP system 130.

After registering the response handler, the broker gateway 304 redirects 318 the system browser 240 to the modified IdP URL directed to the authentication server 230. The authentication server 230 intercepts 320 the redirect to the modified IdP URL redirect and requests 322 a SAML authentication request for the IdP system 130 from the main gateway 302. For instance, the authentication server 230 may request the SAML authentication request from the main gateway 302 using session information stored by the native application 210 for a communication session between the native application 210 and the main gateway 302. Responsive to the request 322, the main gateway 302 generates 324 the SAML authentication request and transmits 326 the SAML authentication request to the authentication server 230. For example, the main gateway 502 may transmit the SAML authentication request using the SAML POST binding. Having obtained the SAML authentication request, the authentication server 230 redirects 328 the system browser 240 to the IdP URL through the system browser 240 using the SAML authentication request.

After the system browser 240 redirects to the IdP URL, the system browser 240 facilitates 330 authentication of the user through the IdP system 130. For example, the system browser 240 may display an authentication interface of the IdP system 130 corresponding to the IdP URL on a display of the client device 110. In this case, the user of the native application 210 may submit authentication credentials to the IdP system 130 through the authentication interface, such as a user identifier, password, authentication factor, or any other suitable authentication credential.

After the user authenticates with the IdP system 130, the broker gateway 304 receives 332 a SAML authentication POST response from the IdP system 130 via the registered authentication response handler 316. In order to forward the authentication response 332 to the authentication server 230, the broker gateway 304 partitions 334 the SAML authentication POST response into a set of data chunks based on a URL size limit of the system browser 240. The broker gateway transmits 336 a current data chunk to the authentication server 230 via a redirect through the system browser 240. After receiving the current data chunk, the authentication server 230 processes information included in the browser redirect to determine whether all of the set of data chunks have been received. If all of the data chunks have not been received, the authentication server 230 requests 338 a next data chunk from the broker gateway 304 via another browser redirect through the system browser 240. The broker gateway 304 and the authentication server 230 repeat 340 steps 336 and 338 until all data chunks of the set of data chunks have been transmitted to the authentication server 230.

After receiving all data chunks of the set of data chunks, the authentication server 230 reassembles 342 the SAML authentication response from the set of data chunks. The native application 210 transmits 344 the reassembled SAML authentication response to the main gateway 302. For example, the native application 210 may provide the reassembled SAML authentication response to an authentication callback registered by the main gateway 302. Finally, the main gateway 302 processes 346 the SAML authentication response in order to provide the native application 210 access to the service of the service provider 120 if the SAML authentication response indicates the user was successfully authenticated.

FIG. 4 illustrates an embodiment of a second sequence of interactions 400 for authenticating a user of the native application 210 using the IdP system 130. The sequence of interactions 400 includes many of similar interactions to that of the sequence of interactions 300, and the description of these interactions in reference to FIG. 3 above also applies to relevant interactions of the sequence of interactions 400. In comparison with the sequence of interactions 300, in the sequence of interactions 400 the native application 210 requests 412 the SAML authentication request from a main gateway 402 before forwarding 420 the modified redirect request to the system browser 240. For instance, the web view module 220 may request the SAML authentication request from the main gateway 402 and receive the SAML authentication request transmitted 416 by the main gateway 402. The native application 210 additionally caches 418 the SAML authentication request on the authentication server 230. At step 430, the authentication server 230 redirects the system browser 240 to the IdP system 130 using the cached SAML authentication request, rather than requesting the SAML authentication request from the main gateway as in the sequence of interactions 300. The remaining interactions of the sequence of interactions 400 are similar to corresponding interactions of the sequence of interactions 300 as described above with reference to FIG. 3. The sequence of interactions 400 may be used instead of the sequence of interactions 300 in various embodiments, such as to optimize performance or simplify implementations across different platforms or system architectures (e.g., if the client device 110 is a mobile computing device vs a non-mobile computing device).

FIG. 5 illustrates an embodiment of a third sequence of interactions 500 for authenticating a user of the native application 210 using the IdP system 130. Unlike the sequence of interactions 300 or 400, in the sequence of interactions 500 the IdP authentication request for the IdP system 130 is not communicated by a main gateway 502 to the native applications 210 separately from the redirect request (e.g., using an HTTP POST Request), as in steps 322-326 and 412-416. Instead, the main gateway 502 includes the IdP authentication request in the redirect request transmitted to the native application 210, such as by embedding the IdP authentication request within a URL of the redirect request as a query parameter. For instance, the IdP system 130 may use the SAML authentication protocol with an HTTP Redirect-binding instead of an HTTP POST binding, or may use an authentication protocol other than SAML that is configured to embed the IdP authentication request within URL query parameters. As such, in the sequence of interactions 500 the main gateway 502 generates 508 a redirect request that includes the IdP URL and an IdP authentication request for the IdP system 130. The main gateway 502 then transmits 510 the redirect request including the IdP authentication request to the native application 210, and the broker gateway 504 redirects 518 the system browser 240 directly to the IdP URL 518 without modifying the IdP URL (e.g., as in steps 318 and 426) and without the redirect being intercepted by the authentication server 230 (e.g., as in steps 320 and 428).

In some alternative embodiments to the one depicted in FIG. 5, the broker gateway 504 transmits the IdP authentication response directly to the authentication server 230 via a browser redirect through the system browser 240 without partitioning the authentication response or sequentially transmitting data chunks (e.g., as in steps 524-530). For example, the IdP system 130 may use an authentication protocol that can be configured to transmit an IdP authentication response using some HTTP communication method other than an HTTP POST. In this case, after receiving the IdP authentication response, the authentication server 230 may redirect the authentication response to the native application 210 for the native application to transmit the IdP authentication response to the main gateway 502.

Method of Secure IdP Authentication for Native Application

Figure 6:
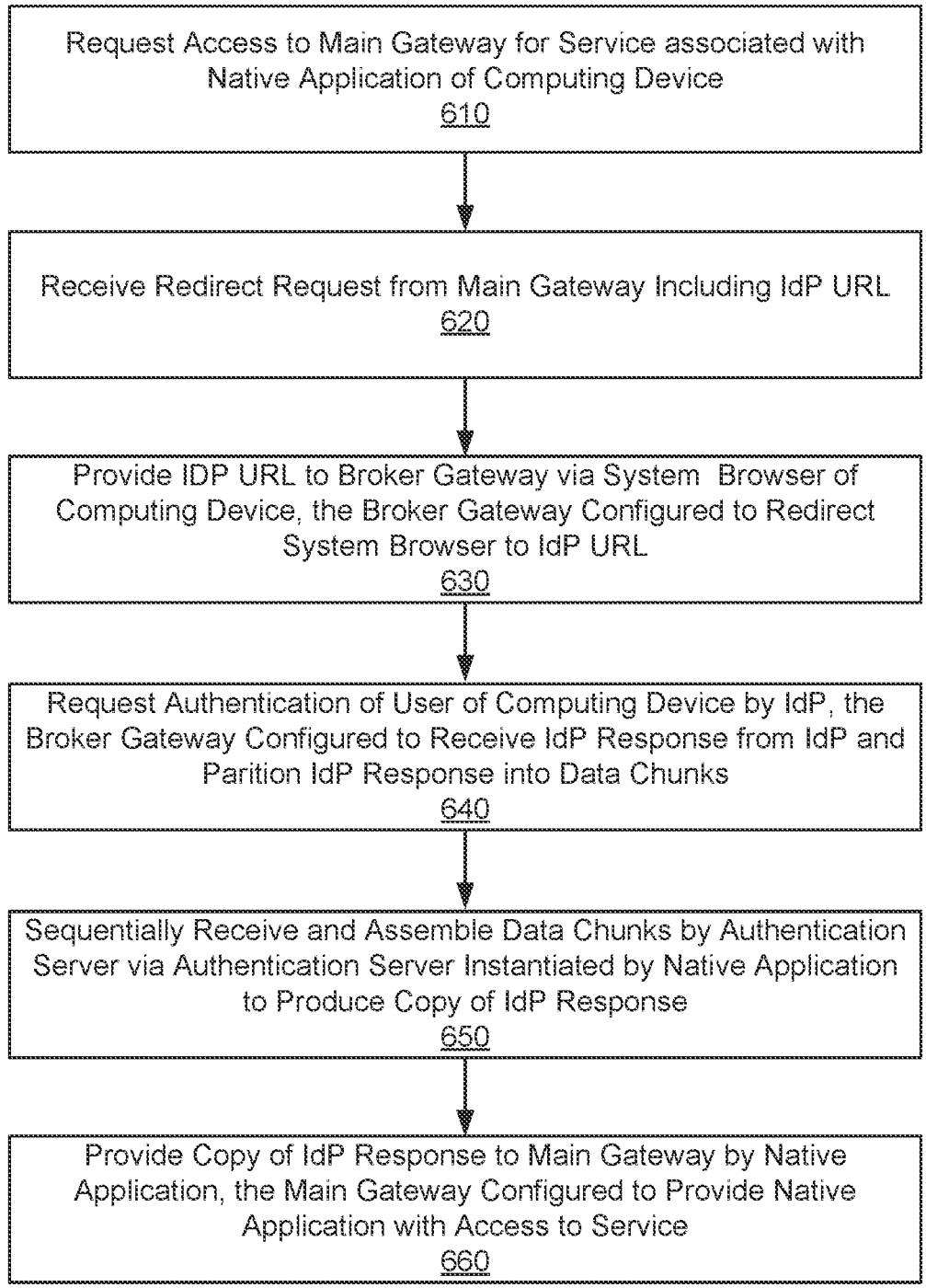
FIG. 6 is a flowchart illustrating an embodiment of a process 600 for securely authenticating a user of a native application through an IdP for accessing a web service.

FIG. 6 is a flowchart illustrating an embodiment of a process 600 for securely authenticating a user of a native application through an IdP for accessing a web service. In the embodiment shown, the steps of the process 600 are performed by certain components of a computing device (e.g., the client device 110). In other embodiments, the steps of the process 600 may be accomplished by other suitable components, e.g., of the computer environment 100, that those depicted in FIG. 6 and described below.

The process 600 includes the computing device requesting 610, via a native application executing on the computing device, access to a service from a main gateway of a service provider associated with the native application. For instance, the web view module 220 of the native application 210 may request access a service of the service provider system 120.

The process 600 further includes the computing device receiving 620, via the native application, a redirect request from the main gateway including an IdP URL directed to a network address of an IdP. For example, the user of the client device 110 may select authentication via the IdP system 130 using a web view of the native application 210. As described above with reference to FIGS. 2A, 2B, and 3-5, the redirect request may also include a redirect URL directed to a broker gateway of the service provider.

The process 600 further includes the computing device providing 630, via a web browser of the computing device, the IdP URL to a broker gateway of the service provider using the redirect request. For instance, as described above with reference to FIGS. 2-5, the redirect request may include a redirect URL directed to a broker gateway of the service provider. The broker gateway is configured to redirect the system browser to the IdP URL, e.g., via an additional redirect request.

The process 600 further includes the computing device requesting 640, by the web browser, authentication of a user of the computing device by the IdP. For instance, the computing device may display through the web browser an authentication interface of the IdP for receiving authentication credentials of the user. The broker gateway is further configured to receive an IdP authentication response from the IdP based on the authentication of the user and to partition the IdP response into a set of data chunks. Each data chunk of the set of data chunks are less than a threshold size selected based on a browser URL size limit, e.g., of the web browser.

The process 600 further includes the computing device sequentially receiving and assembling 650, by the authentication server, the set of data chunks from the broker gateway to produce a copy of the IdP authentication response. For example, the authentication server and the broker gateway may communicate back and forth via a series of redirect requests through the web browser, as described above with reference to FIGS. 2-4.

The process 600 further includes the computing device providing 660, by the native application, the copy of the IdP authentication response to the main gateway. The main gateway is configured to process the copy of the authentication response and, if the copy of the authentication response indicates the user was successfully authenticated, provide the native application with access to the main service.

CONCLUSION

Figure 7:
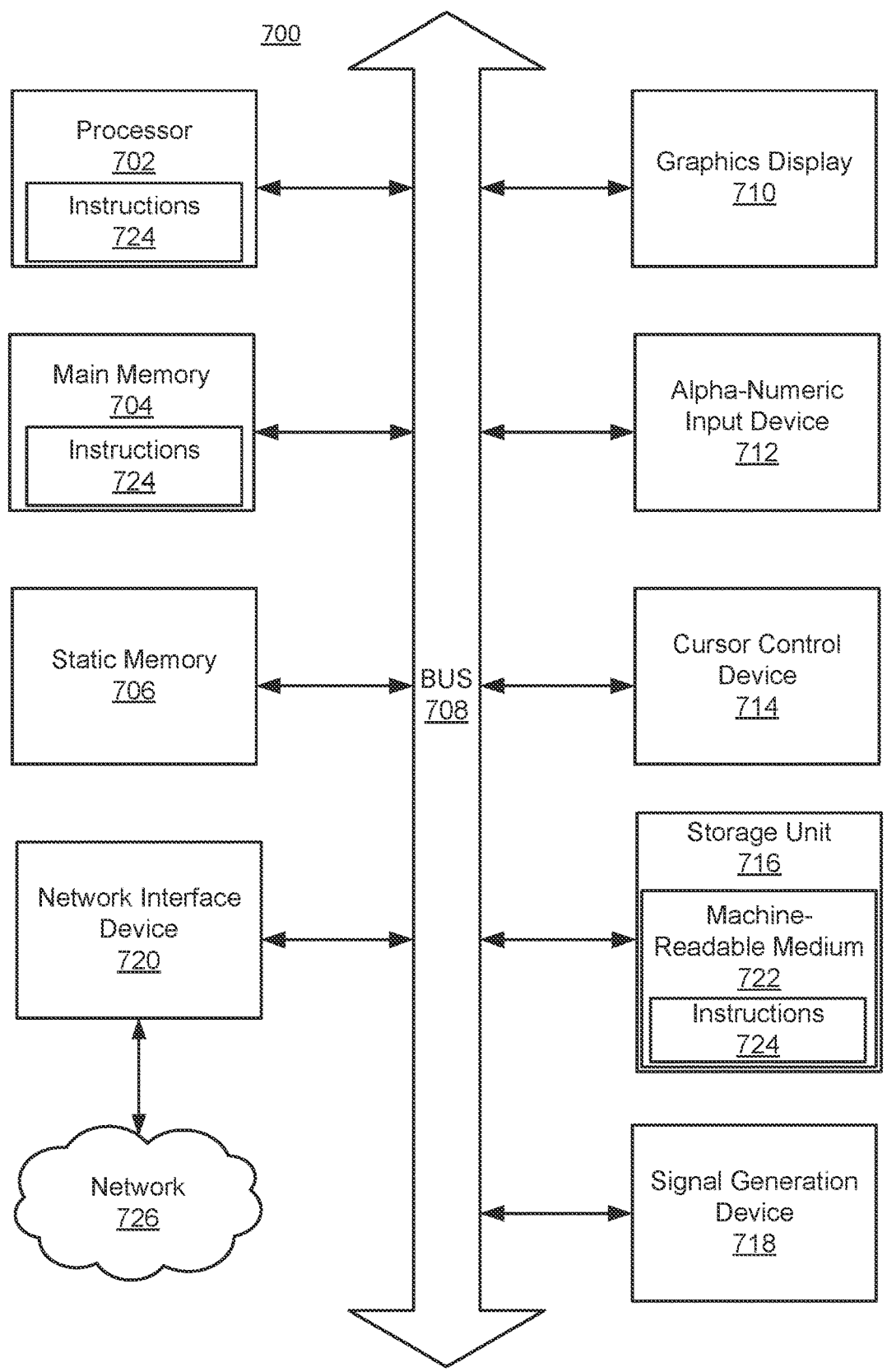
FIG. 7 is a block diagram illustrating components of an example machine able to read instructions from a machine-readable medium and execute the instructions in one or more processors, in accordance with some embodiments.

FIG. 7 is a block diagram illustrating components of an example machine able to read instructions from a machine-readable medium and execute them in one or more processors (or controllers). Specifically, FIG. 7 shows a diagrammatic representation of one or more computing devices of the system environment 100. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708. In some embodiments, the computer system 700 may include cell phone or smartphone hardware, such as a camera, motion sensor, accelerometer, scanner (or QR code reader), global positioning system (GPS) functionalities and geolocation abilities, near field communication, etc.

The storage unit 616 includes a machine-readable medium 722 on which is stored instructions 724 (e.g., software) embodying any one or more of the methodologies or functions described herein. For example, the instructions 724 may include instructions for implementing the functionalities of the client device 110 or the service provider system 120. The instructions 724 may also reside, completely or at least partially, within the main memory 704 or within the processor 702 (e.g., within a processor's cache memory)

during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by any claims that issue.

What is claimed is:

1. A method comprising:
   intercepting, by an authentication server, a web browser redirect requested from a broker gateway;
   redirecting, by the authentication server, a web browser to an identity provider using a cached security assertion markup language ("SAML") authentication request received from a main gateway; and
   providing sequentially received partitioned SAML components from the broker gateway assembled into a SAML authentication response to the main gateway.

2. The method of claim 1, wherein the broker gateway receives the SAML authentication response from an identity provider and partitions the SAML authentication response into a plurality of partitioned components.

3. The method of claim 1, wherein assembling the partitioned SAML components comprises extracting a portion of the SAML authentication response from a URL corresponding to each of the partitioned SAML components and concatenating the extracted portions of the SAML authentication response.

4. The method of claim 3, wherein the broker gateway embeds portions of the SAML authentication response into the URLs such that a size of the URL is below the web browser URL size limit.

5. The method of claim 1, wherein the authentication server is initialized within a native application.

6. The method of claim 1, wherein the web browser redirect request is modified to be directed to the authentication server, and wherein the broker gateway registers a response handler using an authentication server port included within the modified redirect request.

7. The method of claim 1, wherein the main gateway generates the web browser redirect request in response to receiving a request for access from a native application.

8. The method of claim 7, wherein the web browser redirect request includes an identify provider ("IdP") URL.

9. The method of claim 1, wherein the SAML authentication request is generated by the main gateway in response to a request for an SAML authentication request received from a native application.

10. The method of claim 9, wherein the native application communicates with the main gateway using a web view of the native application.

11. A non-transitory computer-readable storage medium storing instructions that, when executed by a processor, cause the processor to perform operations comprising:
    intercepting, by an authentication server, a web browser redirect requested from a broker gateway;
    redirecting, by the authentication server, a web browser to an identity provider using a cached security assertion markup language ("SAML") authentication request received from a main gateway; and
    providing sequentially received partitioned SAML components from the broker gateway assembled into a SAML authentication response to the main gateway.

12. The non-transitory computer-readable storage medium of claim 11, wherein the broker gateway receives the SAML authentication response from an identity provider and partitions the SAML authentication response into a plurality of partitioned components.

13. The non-transitory computer-readable storage medium of claim 11, wherein assembling the partitioned SAML components comprises extracting a portion of the SAML authentication response from a URL corresponding to each of the partitioned SAML components and concatenating the extracted portions of the SAML authentication response.

14. The non-transitory computer-readable storage medium of claim 13, wherein the broker gateway embeds portions of the SAML authentication response into the URLs such that a size of the URL is below the web browser URL size limit.

15. The non-transitory computer-readable storage medium of claim 11, wherein the authentication server is initialized within a native application.

16. The non-transitory computer-readable storage medium of claim 11, wherein the web browser redirect request is modified to be directed to the authentication server, and wherein the broker gateway registers a response handler using an authentication server port included within the modified redirect request.

17. The non-transitory computer-readable storage medium of claim 11, wherein the main gateway generates the web browser redirect request in response to receiving a request for access from a native application.

18. The non-transitory computer-readable storage medium of claim 17, wherein the web browser redirect request includes an identify provider ("IdP") URL.

19. The non-transitory computer-readable storage medium of claim 11, wherein the SAML authentication request is generated by the main gateway in response to a request for an SAML authentication request received from a native application.

20. The non-transitory computer-readable storage medium of claim 19, wherein the native application communicates with the main gateway using a web view of the native application.

* * * * *

UNITED STATES PATENT AND TRADEMARK OFFICE
CERTIFICATE OF CORRECTION

| | |
|---|---|
| PATENT NO. | : 12,015,609 B2 |
| APPLICATION NO. | : 18/411622 |
| DATED | : June 18, 2024 |
| INVENTOR(S) | : Specht et al. |

It is certified that error appears in the above-identified patent and that said Letters Patent is hereby corrected as shown below:

In the Claims

In Column 18, in Claim 8, Line 63, delete "identify" and insert -- identity --, therefor.

In Column 20, in Claim 18, Line 19, delete "identify" and insert -- identity --, therefor.

Signed and Sealed this
Tenth Day of September, 2024

Katherine Kelly Vidal
*Director of the United States Patent and Trademark Office*